United States Patent [19]

Loizeau

[11] 4,412,606

[45] Nov. 1, 1983

[54] TORSION DAMPER DEVICE FOR AUTOMOTIVE VEHICLE CLUTCH FRICTION DISC

[75] Inventor: Pierre Loizeau, Ville d'Avray, France

[73] Assignee: Societe Anonyme Francaise du Ferodo, Paris, France

[21] Appl. No.: 123,509

[22] Filed: Feb. 21, 1980

[30] Foreign Application Priority Data

Feb. 23, 1979 [FR] France .................. 79 04719

[51] Int. Cl.³ .......................................... F16D 3/14
[52] U.S. Cl. .......................... 192/106.2; 192/105 BB; 192/105 CD
[58] Field of Search ............ 192/106.2, 106.1, 103 B, 192/105 BA, 105 BB, 105 CD, 70.18; 64/27 C

[56] References Cited

U.S. PATENT DOCUMENTS

| 2,114,247 | 4/1938 | Davis | 192/70.18 X |
| 3,138,039 | 6/1964 | Zeidler et al. | 192/106.2 |
| 3,811,545 | 5/1974 | Sato et al. | |
| 4,122,931 | 10/1978 | Maucher et al. | 192/106.2 |
| 4,212,380 | 7/1980 | Billet | 192/106.2 |

FOREIGN PATENT DOCUMENTS

| 1113600 | 12/1955 | France . | |
| 1185946 | 2/1959 | France . | |
| 2242606 | 3/1975 | France . | |
| 2270491 | 12/1975 | France . | |
| 2361574 | 3/1978 | France | 192/106.2 |
| 2386729 | 11/1978 | France . | |
| 1426885 | 3/1976 | United Kingdom . | |

*Primary Examiner*—George H. Krizmanich
*Attorney, Agent, or Firm*—Charles A. Brown

[57] ABSTRACT

This torsion damping device comprises two coaxial parts, namely a hub (10) and a hub disc (11), fitted mutually rotatably within the limits of a definite angular play and counter to springs (16). The torsion damping device also comprises at least one locking element (22, 40, 55, 66, 74) which is sensitive to centrifugal force and which is reversibly movable between a position for which, inoperative, the locking element permits freedom of action to the springs (16), and a position for which, producing an abutment of the hub disc (11) against the hub (10), the locking element renders the springs (16) inoperative. Application of the torsion damping device is especially to clutch friction plates for motor vehicles.

21 Claims, 18 Drawing Figures

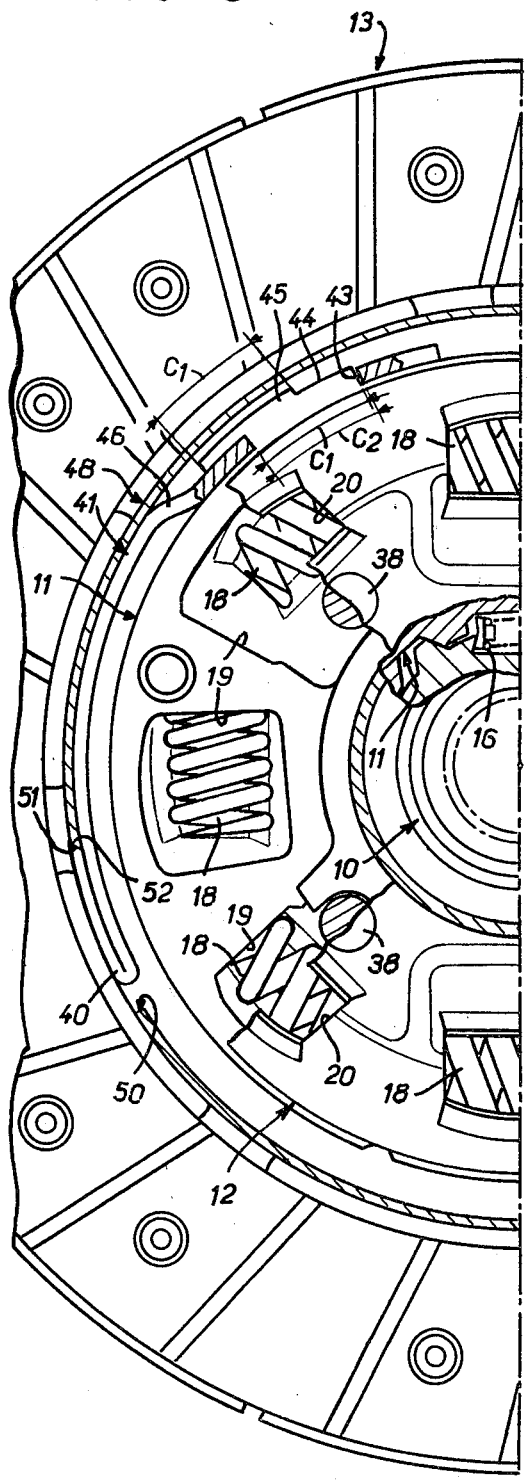
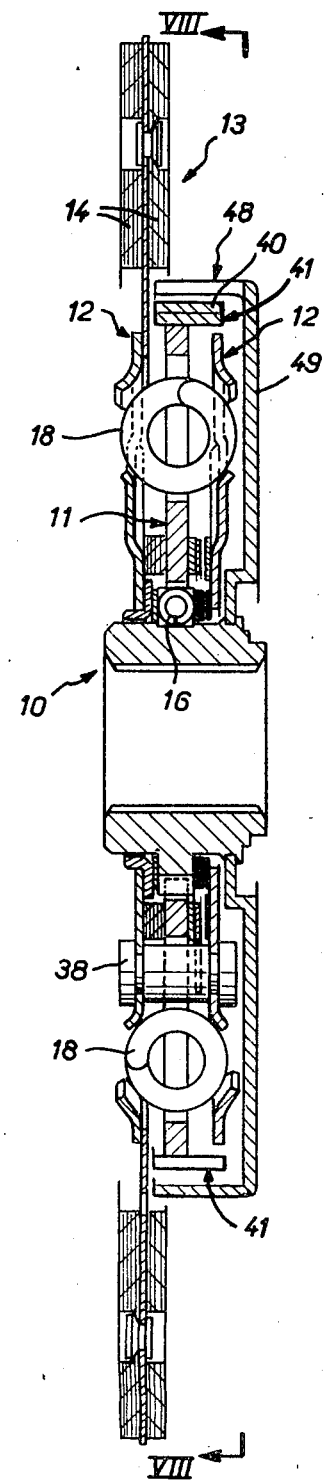
FIG. 10
FIG. 9

TORSION DAMPER DEVICE FOR AUTOMOTIVE VEHICLE CLUTCH FRICTION DISC

The present invention relates in a general way to torsion damping devices which comprise at least two coaxial parts fitted for mutual rotation within the limits of a definite angular play and counter to elastic means adapted to act circumferentially between them, hereinafter called circumferentially effective elastic means.

As is known, such a torsion damping device is customarily involved in the construction of a clutch friction means, especially for motor vehicles, one of its rotary parts then carrying a friction disc intended to be made integral in rotation with a first shaft, in practice a driving shaft, the output shaft of an engine, whereas another of said rotary parts is carried by a hub intended to be made integral in rotation with a second shaft, in practice a driven shaft, the input shaft of a gearbox.

Such a device actually permits the obtention of a regulated transmission of the torque applied to one of its rotary parts when the other is itself the object of a torque, i.e., to filter the vibrations which may appear all along the kinematic chain passing from the engine to the driven road wheels, in which it is inserted.

As is likewise known, it is advantageous, at least for certain applications, and especially for that relating to clutch friction means for motor vehicles, that for low values of the angular play between the two rotary parts constituting such a torsion damping device, the torque transmitted between them remains low.

In fact this arrangement, which involves the use of circumferentially effective elastic means of low rigidity for the low torque values, especially permits eliminating the gearbox noises in neutral when the relevant vehicle is stationary, hereinafter called neutral noises, especially when hot.

And it is clear that, at least in some degree, it is desirable from this standpoint alone that the range of angular play during which said elastic means of low rigidity act should be as wide as possible.

However, the latter obviously become saturated very rapidly for a low value of torque, as soon as, a gear being engaged, an action is exerted upon the accelerator of the relevant vehicle with a view to "on haul" operation of the assembly.

If the action upon the accelerator is discontinued, the torque between the rotary parts constituting the torsion damping device in question changes direction, and the operation of the assembly then becomes of the so-called "pull-back" type.

This then results in an instantaneous and noisy rocking of one of said parts with reference to the other.

Said rocking, which likewise occurs during the change from "pull-back" operation to "on haul" operation, corresponds to the taking up of clearance to be effected between the two rotary parts in question due to a saturation, first in one direction then in the other, of the low rigidity elastic means acting between them, and it is accompanied by a noise which is the more intense as, on the one hand, the corresponding range of angular play is greater, and on the other hand, the gear ratio engaged is shorter.

There are thus two contradictory desiderata to be reconciled, the one relating to the adoption of a range of angular play in which, at low torque values, only the circumferentially acting elastic means of low rigidity act for a good absorption of the neutral noises, especially for diesel-engined vehicles, the idling regime of which is particularly low and the cyclic accelerations particularly substantial, the other relating to the taking up of angular clearance customarily associated with such a range during the change from on haul operation, with the accelerator depressed, to pull-back operation with the accelerator relaxed, and vice versa, such a taking up of angular clearance being itself the origin of noise, and the latter being the louder as said range is itself the wider.

The present invention has generally speaking as its object an arrangement permitting this difficulty to be overcome.

More specifically, it has as its object a torsion damping device, particularly a clutch friction means for a motor vehicle clutch, of the type comprising at least two coaxial parts fitted mutually rotatably within the limits of a definite angular play and counter to elastic means adapted to act circumferentially between them for at least one range of said play, called circumferentially effective elastic means, said torsion damping device being characterised in that it comprises at least one locking element which is sensitive to centrifugal force counter to return means and which is thus reversibly movable between a standby position, hereinafter called for convenience the standby retracted position, for which it is inoperative and therefore allows freedom of action to the circumferentially effective elastic means, and an operative position, hereinafter called for convenience operative deployed position, for which, beyond a definite speed of rotation associated with said return means, it produces a positive circumferential element of one of said parts against the other, for at least one of the directions of rotation, and therefore renders said circumferentially effective elastic means inoperative for at least a portion of the said range of play.

It is of course already known to associate any element sensitive to centrifugal force with a clutch.

This arrangement is described, e.g., in the French Pat. Nos. 1,113,600 and 1,185,946.

However, in both these patents, the element sensitive to centrifugal force co-operates with an element external to the clutch friction means, acting e.g., between the hub of the latter and one of the plates between which its friction disc is arranged, in practice the reaction plate or flywheel of the clutch.

According to the invention, such a centrifugal element acts in the very core of the torsion damping device, or clutch friction means, in question, by cooperating with two elements both belonging to said torsion damping device.

In neutral, with the vehicle stationary, said torsion damping device rotates only at low speed, and the locking element sensitive to centrifugal force which it comprises according to the invention is then inoperative: the circumferentially effective elastic means of low rigidity provided between the two rotary parts constituting said device act freely between the latter, for the entire range of angular play which is allotted to them, irrespectively of the width of said range.

On the other hand, the vehicle being in motion, said torsion damping device rotates at sufficient speed, the locking element according to the invention changes of itself, by the effects of centrifugal force resulting from said rotation, from its previous standby retracted position into its operative deployed position, and for the latter, it is inserted circumferentially between two elements each belonging respectively to the one and to the other of the rotary parts constituting the device.

Subsequently when, for example, a relaxation of the action previously exerted upon the accelerator leads to a change from "on haul" operation to "pull-back" operation, any taking up of circumferential clearance is prohibited between the two rotary parts constituting the device, by the locking element according to the invention until, the speed of rotation of the assembly having decreased, it has regained its standby retracted position by the action of the return means, in practice the resilient means, which are associated with it for that purpose.

Thus all noise is prevented during such a change from on haul operation to pull-back operation, and vice versa, and this irrespectively of the width of the range of angular play in which the circumferentially effective elastic means of low rigidity act for the neutral position at standstill.

Consequently said range can be made as wide as is necessary for good absorption of the neutral noises.

The characteristics and advantages of the invention will furthermore emerge from the description to be given hereinbelow, by way of example, and with reference to the accompanying schematic drawings, wherein.

Figure 1:
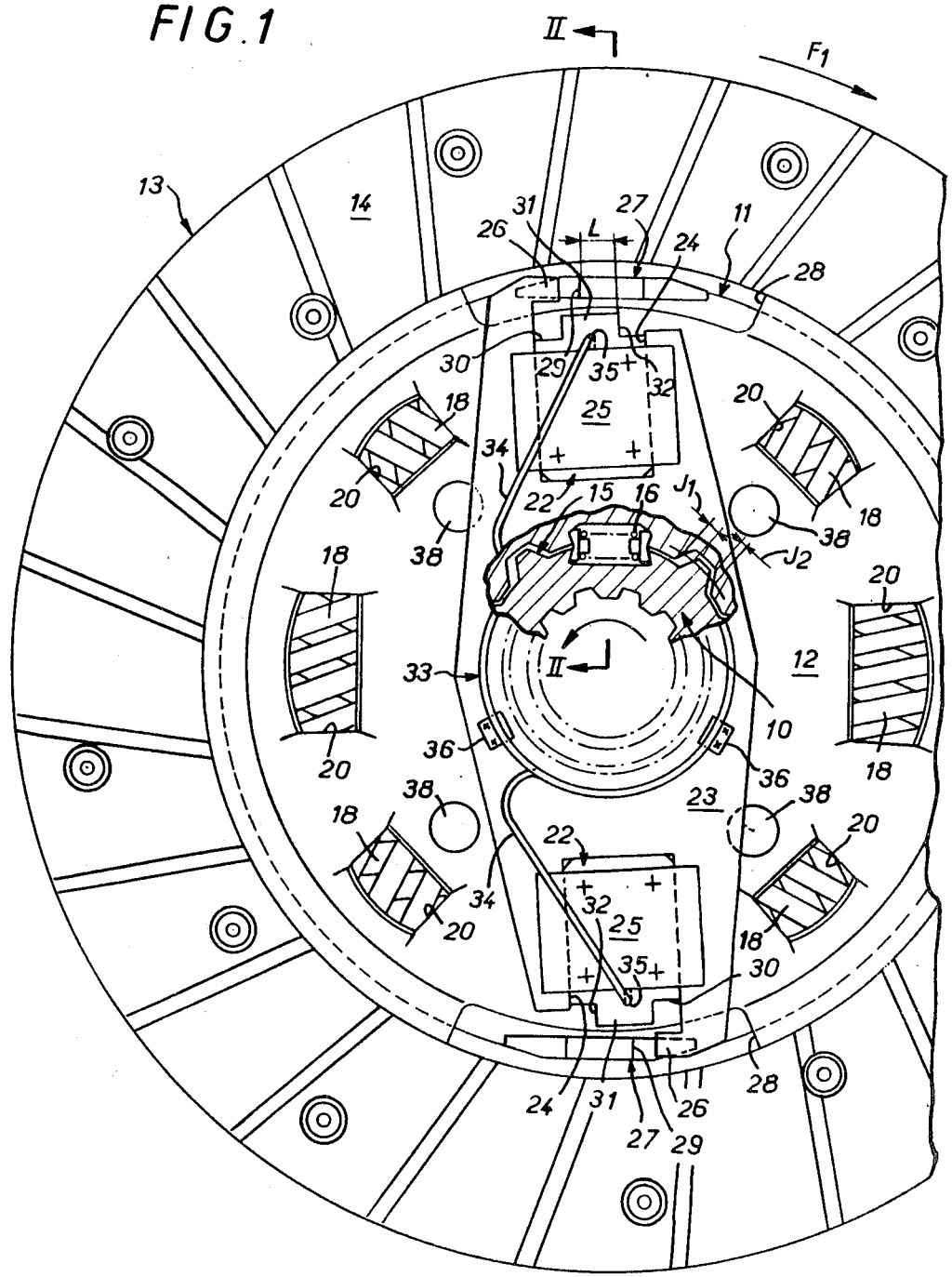
FIG. 1 is a partial view in elevation, with local fragmentation, of a torsion damping device according to the invention, shown stationary.
Figure 2:
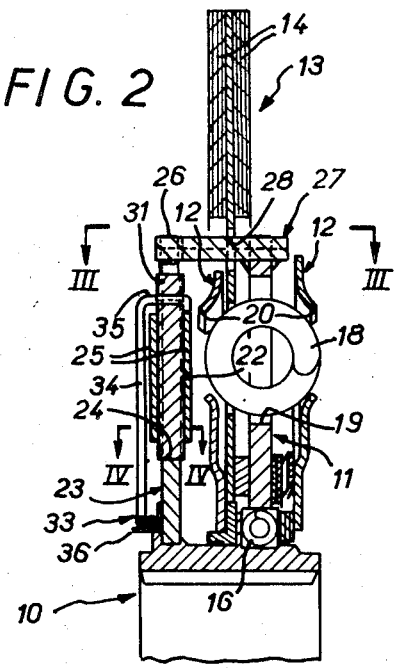
FIG. 2 is a half-view of the same in axial section, made along the line II—II of FIG. 1.
Figure 5:
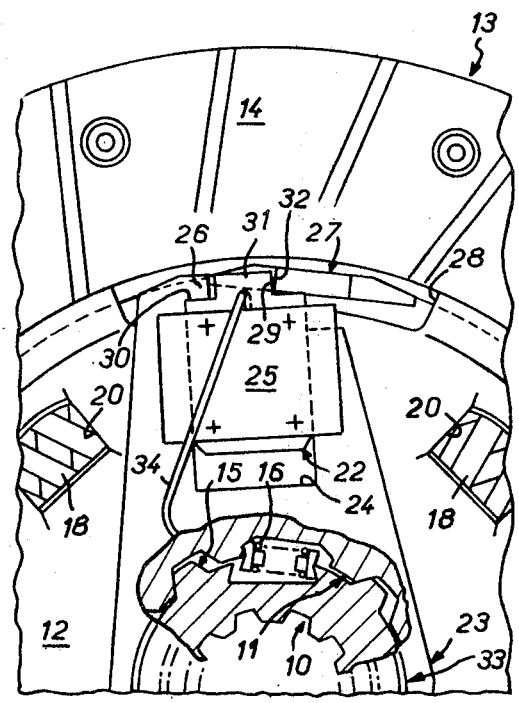
Figure 3:
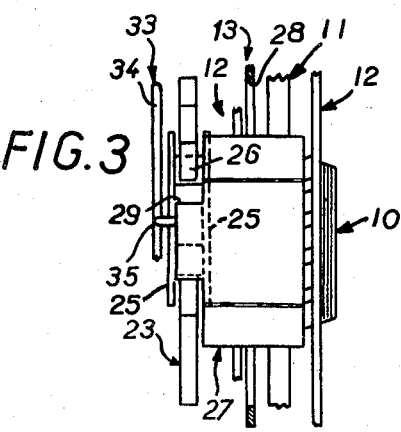
FIG. 3 is a view of the same in partial circumferential section, made along the line III—III of FIG. 2, imagined developed flat.
Figure 7:
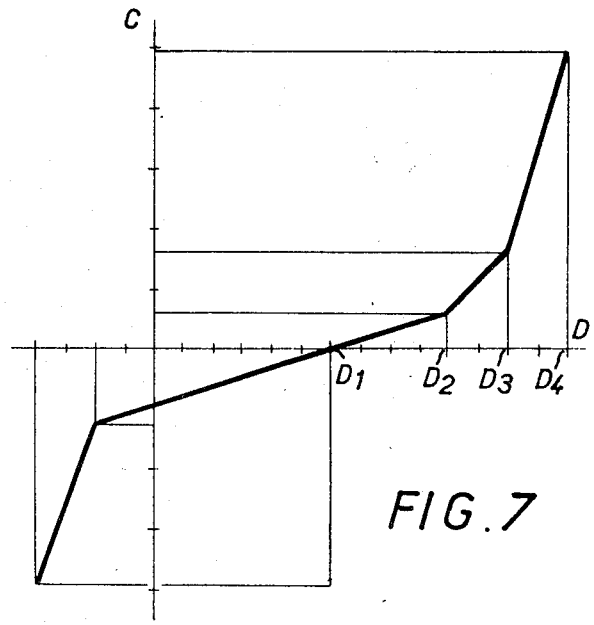
Figure 6:
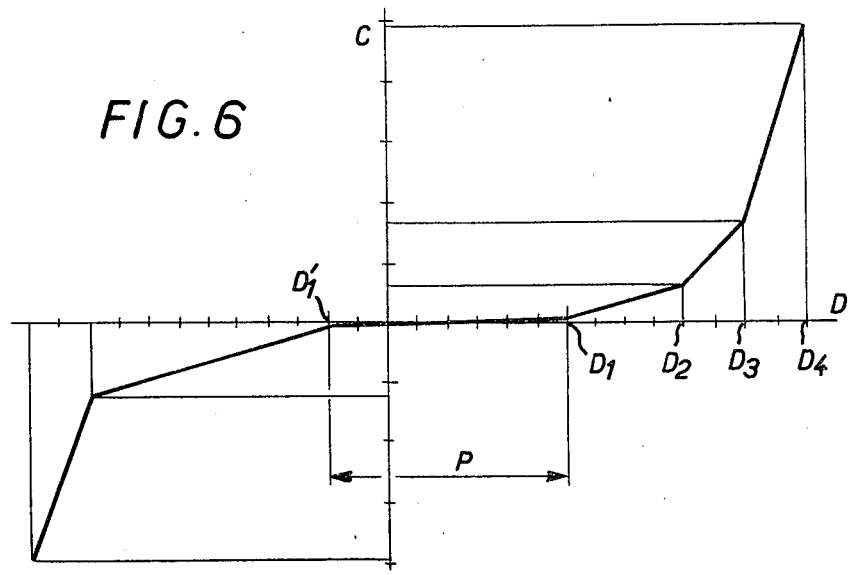
Figure 11:
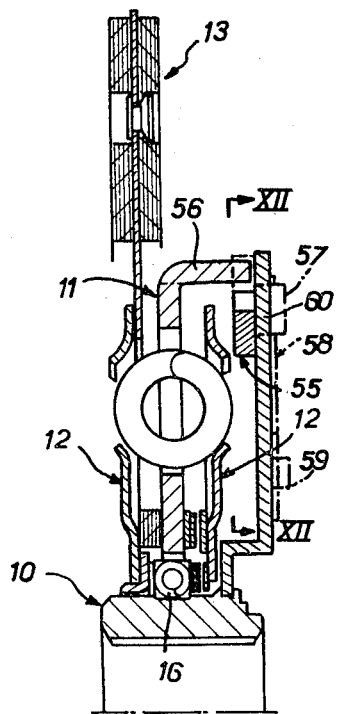
Figure 12:
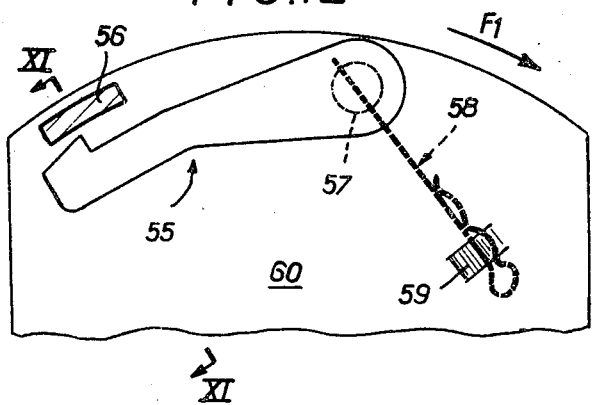
Figure 8:
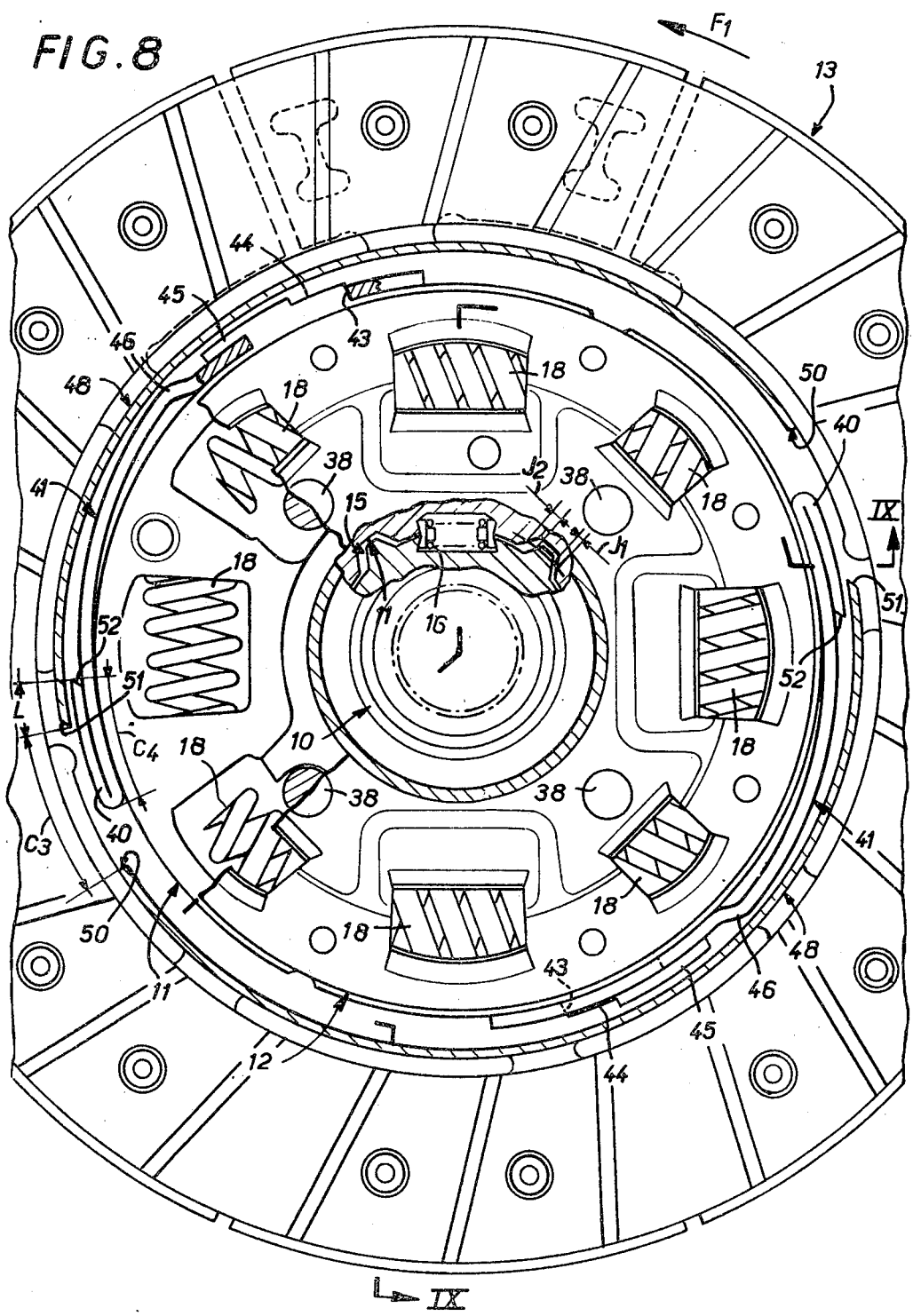
Figure 13:
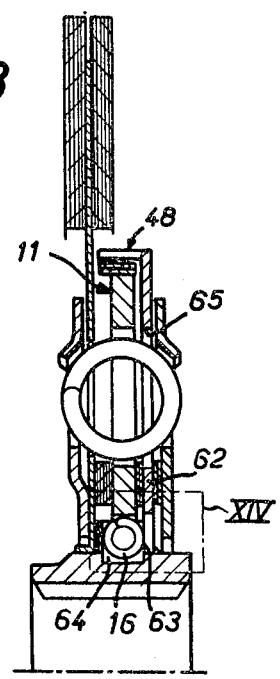
Figure 14:
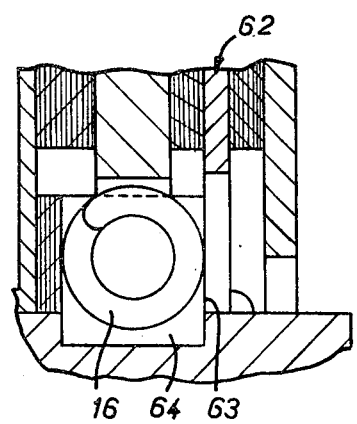

FIG. 5 repeats part of FIG. 1, the torsion damping device in question being imagined in rotation;

FIG. 6 is a graph illustrating the mode of functioning of a prior art torsion damping device;

FIG. 7 is a graph similar to that of FIG. 6, for the torsion damping device according to the invention;

FIG. 8 is a partial view in sectional elevation, made along the line VIII—VIII of FIG. 9, and with local fragmentations, of a variant of embodiment of the torsion damping device according to the invention, shown stationary;

FIG. 9 is a partial view of the same in axial section, made along the dash line IX—IX of FIG. 8;

FIG. 10 partly repeats FIG. 8, the torsion damping device in question being imagined in rotation;

FIG. 11 is a view in partial axial section similar to that of FIG. 9, and relates to another variant of embodiment of the torsion damping device according to the invention, viewed along the line XI—XI of FIG. 12;

FIG. 12 is a partial view of the same in sectional elevation, made along the line XII—XII of FIG. 11;

FIG. 13 is a similar view to that of FIG. 9 and relates to another variant of embodiment;

FIG. 14 repeats on a larger scale the detail of FIG. 13 marked by an inset XIV in the latter;

These figures illustrate in a general way the application of the invention to the construction of a damper hub clutch friction means.

As is known, such a clutch friction means generally comprises a hub 10, a hub disc 11 forming radially an annular piece surrounding the hub 10, two annular guide washers 12 which extend parallel to the hub disc 11, around the hub 10, and which are mutually integral, e.g., by axial columns 38, and a friction disc 13 which, customarily, carries friction linings 14 on its circumference on either side thereof.

In the various exemplary embodiments of the invention illustrated in the figures, the friction disc 13 is integral with the guide washers 12, and the latter are freely rotatable about the hub 10 within the limits of a definite angular play.

These exemplary embodiments relates more particularly to a clutch friction means comprising three coaxial parts fitted mutually rotatably two by two, within the limits of a definite angular play, and counter to elastic means adapted to act circumferentially between said parts, hereinafter called circumferentially effective elastic means.

Such a clutch friction means is described in detail in the French Patent filed on Aug. 29, 1973 under No. 73 31172 and published under No. 2,242,606, and also in the Addition filed on Apr. 12, 1974 under No. 74 12915 and published under No. 2,270,491, attached to said patent.

Such a clutch friction means is not per se a part of the present invention; it will therefore not be described in all its details here, only those elements of said clutch friction means necessary to an understanding of the invention being mentioned hereinbelow.

Briefly, said clutch friction means comprises a first rotary part constituted by the hub 10, a second rotary part constituted by the hub disc 11, meshing means with circumferential clearance 15 being provided between the hub 10 and the hub disc 11, FIG. 1, and a third rotary part formed conjointly by the guide washers 12 and the friction disc 13.

In the meshing means with clearance 15, and within the limits of the angular play permitted by the two tooth systems which constitute them, as detailed hereinbelow, a first circumferentially effective elastic means associated with the first and second rotary parts specified hereinbefore act; these are one or more springs 16 of relatively low rigidity which extend substantially tangentially to a circumference of the assembly, abutting on the one hand against the hub 10 and on the other hand against the hub disc 11, by virtue of housings formed by recesses provided in tooth systems of said parts, and which belong conjointly to a first damping stage.

For the stationary position illustrated in FIG. 1, angular clearances J1, J2 exist between the two tooth systems forming the meshing means with clearance 15, on either side thereof; it is these angular clearances J1, J2 which conjointly define the angular play permitted between the rotary parts in question.

In the exemplary embodiment illustrated in FIGS. 1 to 7, the angular clearance J1 corresponding to on haul operation of the friction means, for which the direction of rotation of the friction disc 13, and hence of the hub disc 11, is imagined to be that marked by the arrow F1 in FIG. 1, is greater than the angular clearance J2 corresponding to pull-back operation; this is not necessarily so.

A second circumferentially effective elastic means provided between the second and third rotary means specified hereinbefore act between the hub disc 11 and the guide washers 12; they are springs 18, of high rigidity, which extend substantially tangentially to a circumference of the assembly, each being housed partly in a port 19 of the hub disc 11 and partly in a port 20 of each guide washer 12, and which belong conjointly to a second damping stage.

In practice, and according to the arrangements described in detail in the French patents mentioned hereinbefore, for at least some of said springs 18 the circumferential length of the ports 19 of the hub disc 11 is different from that of the ports 20 of the guide washers 12, so that the action of said springs 18 is thereby retarded; for example, and this is the case of the exemplary embodiment illustrated, the springs 18 may be distributed into three distinct groups, and the action of said groups of springs may be staggered all along the angular play possible between the guide washers 12 and the hub disc 11, with only a first of said groups of springs acting at the commencement of said play, before the second and the third group is added to them.

The graph of FIG. 6, in which the angular play D is plotted as abscissa and the torque C as ordinate, illustrates the functioning of the damper hub clutch friction means succinctly described hereinbefore when a torque is applied to the friction disc 13 in the direction of the arrow F1 of FIG. 1 and is transmitted by the latter to the hub 10.

For low values of said torque, and this is the case in neutral, with the vehicle stationary, only the springs 16 of the first damping stage act to eliminate the corresponding neutral noises.

As soon as, for on haul operation, the torque increases, this first damping stage becomes saturated and, by the meshing means 15, the angular clearance J1 being absorbed, the hub disc 11 comes into direct engagement with the hub 10, FIG. 5, for a value D1 of the play corresponding to said angular clearance J1.

The first group of the springs 18 then come into action, then, successively, for values D2, D3 of the play, the second and third of said groups, up to the saturation of the second damping stage formed conjointly by these three groups of springs, which then corresponds to the final value D4 of the said play.

For pull-back operation a similar process develops, with the reservation that, in the exemplary embodiment illustrated, the second and third groups of springs 18 then come into action simultaneously; they could of course come into action successively as previously.

Generally, the springs 16 of the first damping stage act in this way in a neutral noise filtration zone P extending from the on haul angular play D1 to a pull-back angular play D'1.

Of course, in order to simplify the graph of FIG. 6, no account is taken here of the hysteresis phenomenon which occurs conjointly due to the internal frictions of the friction means.

According to the invention, there is associated with such a damper hub clutch friction means comprising at least two coaxial parts mounted mutually rotatably within the limits of a definite angular play and counter to a first circumferentially effective elastic means acting between them for at least one range of said play, a locking element which is sensitive to centrifugal force, counter to return means, and which is thus reversibly movable between a standby retracted position for which it is inoperative and therefore permits freedom of action to the first circumferentially effective elastic means, and an operative deployed position for which, beyond a definite speed of rotation associated with said return means, it produces a positive circumferential abutment of one of said parts against the other, for at least one of the directions of rotation, and therefore renders said first circumferentially effective elastic means inoperative for at least a portion of the said range of play.

In the various exemplary embodiments illustrated in the figures, such a locking element is provided between the first part, constituted by the hub 10, and the second part constituted by the hub disc 11.

In practice, two locking elements are provided in mutually diametrally opposite positions.

In the exemplary embodiment illustrated in FIGS. 1 to 5, they are simple strips 22.

For their maintenance and guidance one of the parts in question, the hub 10 in the example illustrated, carries radially a flange 23 which is integral therewith in rotation, said flange being e.g., made a force fit on the hub 10 and crimped on the latter by a technique which is known per se which will therefore not be described in detail here.

It is however self-evident that the flange 23 could be attached to the hub 10 by any other means.

Said flange 23 comprises two guides which are radially elongate and with each of which a strip 22 is engaged.

In the exemplary embodiment illustrated such a guide is constituted simply by a recess 24 of the flange 23 and the corresponding strip 22 is simply fitted slidingly in such a recess 24.

Figure 4:
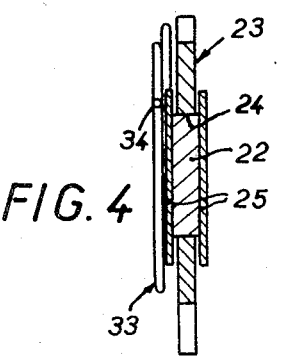
FIG. 4 is another view of the same in partial circumferential section, developed flat, made along the line IV—IV of FIG. 2.

For the axial maintenance of a strip 22, two lamellae 25 are attached thereto, e.g., by welding, on either side of the flange 23, and said lamellae 25 overlap the corresponding recess 24 circumferentially, FIGS. 1 and 4.

At the end of each recess 24 the flange 23 exhibits a retaining nose 26 which projects circumferentially into said recess 24, FIGS. 1 and 5.

Conjointly, the other of the relevant rotary parts, the hub disc 11 in the exemplary embodiment illustrated, carries, in correspondence with each retaining nose 26 of the flange 23, a lug 27 which extends axially towards said flange, by virtue of a passage 28 of the friction disc 13, and which is prolonged axially sufficiently to interfere with the path of the corresponding strip 22 in the recess 24 in which it can slide.

Beyond a shoulder 30 adapted to co-operate in abutment with the corresponding retaining nose 26, each strip 22 comprises a radial prolongation 31 capable of being pinched circumferentially between said retaining nose 26 and the corresponding axial lug 27.

In practice, for the stationary position illustrated in FIG. 1, the circumferential distance L between, on the one hand the lateral edge 29 of a lug 27 closest circumferentially to the corresponding retaining nose 26, and on the other hand, the lateral edge 32 of the radial prolongation 31 of the corresponding strip 22 farthest circumferentially from said retaining nose 26, corresponds angularly to not more than the angular clearance J1 defined hereinbefore.

And of course, each retaining nose 26 has a sufficiently short circumferential length not to oppose an engagement, facing its own lateral edge, of the radial prolongation 31 of the corresponding strip 22.

In the exemplary embodiment illustrated the two strips 22 have in common the return means which are associated with them, and the latter are constituted by a torsion spring 33, the turns of which surround the hub 10, and the branches 34 of which are each respectively engaged by an axial bend 35 with the strips 22, such a bend 35 being engaged in a passage provided for that purpose in such a strip and folded at its end beyond the latter.

On the internal circumference of the median torsion part of the spring 33, angle shaped strips 36 are added from place to place, e.g., by welding to the flange 23 for appropriate maintenance of said torsion spring.

Each strip 22 costitutes an inertia block sensitive to centrifugal force.

The spring 33 which forms its return means is arranged so that at standstill, FIGS. 1 to 4, each strip 22 occupies a standby retracted position in abutment against the floor of the corresponding recess 24 of the flange 23, for which it is inoperative; the spring 33 is also tared so as to maintain the strips 22 in such a standby retracted position so long as the speed of rotation of the friction means remains below a definite value, of the order e.g., of 900 r.p.m., and to yield only above said speed.

Consequently, for a speed of rotation below 900 r.p.m., the representative graph of the functioning of the friction means remains that of FIG. 6: the springs 16 of the first damping stage have freedom of action.

This is no longer the case above 900 r.p.m., as soon as the springs 16 are saturated, and hence, the angular clearance J1 being absorbed, the axial lugs 27 are consequently moved circumferentially with reference to the retaining noses 26 by an angle corresponding at least to said clearance, thus allowing free passage for the prolongations 31 of the strips 22.

In fact, by the effects of centrifugal force, the strips 22 constituting the locking elements according to the invention then come to occupy an operative deployed position for which, due to the circumferential movement stipulated hereinbefore for the axial lugs 27, they are radially in abutment by their shoulders 30 against said retaining noses 26 and have their prolongations 31 inserted circumferentially between the latter and said axial lugs 27, FIG. 5.

Then, if by a relaxation of the depressive action previously exerted upon the accelerator of the vehicle in question, the functioning of the assembly changes from the on haul mode of operation to the pull-back mode of operation, the axial lugs 27 come to bear against the prolongations 31 of the strips 22, and the hub disc 11 thus finds a positive circumferential abutment against the hub 10 through the axial lugs 27, the prolongations 31 of the strips 22, said strips 22 and the flange 23, without there being any inverse angular play whatsoever between said hub disc 11 and the hub 10, and therefore without any noise whatsoever being generated.

In other words, the springs 16 are then rendered inoperative.

In the representative graph of the corresponding function, FIG. 7, the filtration zone of the neutral noises due to said springs 16 is eliminated.

It is therefore as though only the springs 18 of the second damping stage of the friction means then act to filter the on haul or pull-back noises.

If the circumferential distance L specified hereinbefore corresponds exactly to the angular clearance J1, the pull-back inoperatisation of the springs 16 occurs at the abscissa point D1; if this circumferential distance L corresponds angularly to a value below that of the angular clearance J1, it occurs for an abscissa point below that of the point D1.

As illustrated, a clearance may exist circumferentially between the radial prolongation 31 of each of the strips 22 and the corresponding retaining nose 26, the abutment of said strips 22 against the flange 23 occurring by their corresponding lateral edge, in the recesses 24 of the flange 23; as a variant the prolongations 31 of the strips 22 may bear circumferentially upon the retaining noses 26, the latter then having a double function of circumferential abutment and radial retention.

Of course, as soon as the speed of rotation of the friction means falls below 900 r.p.m., the spring 33 returns the strips 22 into the standby retracted position, and the springs 16 are once more enabled to act.

In the variant of embodiment illustrated in FIGS. 8 to 10, two locking elements 40 are employed as previously, in diametrally opposite positions, to prevent any undesirable reaction upon the axis of the assembly.

But according to this variant of embodiment, each of said locking elements 40 is carried by an elastically deformable arm 41 which extends circumferentially and which, remotely from such a locking element 40, is integral with one of the first parts constituting the friction means, such an elastically deformable arm 41 also constituting in itself the return means associated with the locking element 40 which it carries.

In the exemplary embodiment illustrated, the part of the clutch friction means in question which thus carries the locking elements 40 is that constituted by the hub disc 11, each elastically deformable arm 41 being anchored by its end opposite the locking element 40 which it carries, to the hub disc 11 at the circumference of the latter.

In the exemplary embodiment illustrated, such an elastically deformable arm 41 is constituted by a metallic web of radially relatively thin and axially relatively elongate cross-section, but it is self-evident that, as a variant, such a web could be of axially relatively thin and circumferentially relatively elongate cross-section.

The corresponding locking element 40 is constituted, in the exemplary embodiment illustrated, by a simple U-shaped return fold of the elastically deformable arm 41 which carries it, said fold being made on that side of said arm the farthest radially from the axis of the assembly.

For its integration with the part of the friction means which carries it, and hence with the hub disc 11 in the exemplary embodiment illustrated, such an elastically deformable arm 41 is, in the exemplary embodiment illustrated, simply engaged by a buttonhole 43 on a lug 44 of said hub disc 11, said lug extending radially and being prolonged by a retaining talon 45 which extends circumferentially partly overhanging it, towards the corresponding locking element 40, and which has a circumferential length C1 substantially equal to that of the latter.

The circumferential length C2 of the buttonhole 43 of the elastically deformable arm 41 is slightly greater than such a circumferential length C1 of the lug 44 and of the corresponding retaining talon 45, which permits it to be positioned by simple engagement; in a first stage the elastically deformable arm 41 is presented radially by its buttonhole 43 onto the retaining talon 45, then after crossing the latter, it is rocked slightly towards the axis of the assembly so as to be able to be engaged beneath said retaining talon 45, and lastly, it is moved circumferentially beneath the latter until it can come to be engaged radially upon the lug 44.

Its maintenance is thereupon assured, since the radial distance separating the retaining talon 45 from the peripheral edge of the hub disc 11 is only slightly greater than its thickness.

Furthermore, for the stationary configuration of the friction means, the free end of the elastically deformable arm 41 carrying the corresponding locking element 40 is flattened elastically against the part which carries it, and hence, in this case, against the peripheral edge of the hub disc 11, so that, for the stationary configuration of the friction means, such an elastically deformable arm is under elastic pretension.

In the exemplary embodiment illustrated, the elastically deformable arm 41 exhibits, in proximity of the retaining talon 45, a deformation 46 which spaces it locally from said peripheral edge of the hub disc 11.

For co-operation with each of the locking elements 40, a crown 48 is associated with the second of the coaxial parts of the relevant clutch friction means, namely, in the exemplary embodiment illustrated, that constituted by the hub 10.

In practice, in this exemplary embodiment, said crown 48 is carried by an annular transverse flange 49, and that is e.g., attached by crimping to the hub 10, as illustrated, like the previous flange 23.

As will be observed, said annular flange 49, which is relatively thin, is arranged outside the volume formed by the guide washers in the exemplary embodiment illustrated.

Consequently, and also taking into consideration the fact that the locking elements 40 and the elastically deformable arms 41 which carry them do not in any way increase the axial dimension of the relevant torsion damping device, it follows that the latter can more easily be suitable for applications wherein the torsion damping device described with reference to FIGS. 1 to 5 would be more difficult to incorporate axially.

For co-operation with each locking element 40, the crown 48 exhibits a groove 50, the circumferential length C3 of which is considerably greater than the length C4 of such a locking element.

In the exemplary embodiment illustrated, that 51 of the axial edges of such a groove 50 which is intended to co-operate with the corresponding locking element 40 is bevelled, and the corresponding edge 52 of said locking element 40 is itself bevelled in complementary manner.

As previously, for the stationary configuration of the friction means, as illustrated in FIG. 8, the circumferential distance L between the edge 52 of a locking element 40 and the axial edge 51 of the corresponding groove 50 of the crown 48 corresponds angularly at most to the angular clearance J1 specified hereinbefore.

In the absence of the locking elements 40, the representative curve of the functioning of the clutch friction means in question would, as previously, be that of the graph of FIG. 6.

Where, as is the case in point, locking elements 40 are present, the low rigidity springs 16 continue to act in the neutral noise filtration zone P so long as the speed of rotation of the friction means remains low, and is e.g., below a value of the order of 900 to 1,100 r.p.m.: below such a value the locking elements 40 are inoperative and they therefore permit freedom of action for the low rigidity springs 16.

On the other hand, above 900 to 1,100 r.p.m., the locking elements 40 change, by the effects of centrifugal force, from their standby retracted position, for which the free end of the elastically deformable arms 41 which carries them is in contact with the peripheral edge of the hub disc 11, FIG. 8, into an operative deployed position for which said free end of the elastically deformable arms 41 is removed from said peripheral edge of the hub disc 11, FIG. 10.

Consequently, as soon as the angular play between the two parts constituting the friction means attains a sufficient value, corresponding e.g., to the absorption of the angular clearance J1 marking the saturation of the low rigidity springs 16, each locking element 40 engages into the corresponding groove 50 of the crown 48, said groove then being radially at its level, FIG. 10.

If the functioning continues to be of the on haul type i.e., if the torque to be transmitted between the constituent parts of the friction means continues to increase, the angular play between the parts constituted respectively by the hub 10 on the one hand and the guide washers 12 and the friction disc 13 on the other hand continues to be deployed, said angular play in fact then being deployed between the hub disc 11 on the one hand and the guide washers 12 and the friction disc 13 on the other hand, up to its final value D4, in accordance with the process previously described.

On the other hand, if by a relaxation of the depressive action previously exerted upon the accelerator of the vehicle in question, the functioning of the assembly changes from such on haul operation to pull-back operation, and if consequently the part of the friction means constituted by the hub 10 undergoes a retrograde relative angular movement with reference to part of said friction means constituted by the hub disc 11, each locking element 40 becomes hooked by its bevelled edge 52 against the bevelled edge 51 of the corresponding groove 50 of the crown 48, and said locking elements 40 then conjointly produce a positive circumferential abutment of one of said parts against the other, for the relevant direction of rotation, rendering the low rigidity springs 16 inoperative in that case.

The representative curve of the functioning of the friction means is then that of the graph of FIG. 7, from which any filtration range due to the low rigidity springs 16 has been eliminated.

Obviously, this remains so as long as the speed of rotation of the friction means is above the value of 900 to 1,100 r.p.m., specified hereinbefore.

As soon as it falls back below this value, the elastically deformable arms 41 return the locking elements 40 to the standby retracted position.

As will be observed, when the speed of rotation of the friction means is sufficient, the locking elements 40 come to bear against the peripheral crown 48 for low values of torque.

Consequently they intervene in the internal friction of the friction means by reason of their relative movement with reference to the crown 48, in contact with which they then are, and therefore participate in the hysteresis of the friction means.

According to a development of the invention, such an intervention is utilized by accentuating it, and for this purpose each locking element 40 is equipped with a friction lining (not shown in the figures) on its face confronting the crown 48.

As a variant, the crown 48 is fitted with such a friction lining (likewise not shown in the figures) on its internal face confronting the locking elements 40.

The hysteresis thus due to the locking elements 40 is a function of the speed, and it is rendered inoperative when, the angular play between the parts in question being sufficient, such a locking element engages in the corresponding groove 50 of the crown 48.

According to a variant not shown, a hysteresis can likewise be obtained between the elastically deformable arms 41 and the crown 48.

As will readily by understood, the bevelling of the edge 52 of the locking elements 40, and the complementary bevelling of the edge 51 of the grooves 50 of the crown 48, are favourable to good pull-back engagement of said locking elements with said crown without undesirable disengagement.

The deformation 46 of the elastically deformable arms 41 carrying said locking elements 40 acts in the same sense.

In the exemplary embodiment illustrated in FIGS. 8 to 10 the elastically deformable arms 41 carrying the locking elements 40 are integral with the hub disc 11, whereas the transverse flange 49 carrying the crown 48 is integral with the hub 10.

It is self-evident that an inverse arrangement could be adopted, the elastically deformable arms 41 being carried by the flange 49, and the crown 48 by the hub disc 11, the respective roles of the two coaxial rotary parts constituted by the hub 10 and the hub disc 11 being reversed in such a case.

This is actually the case of the variant of embodiment illustrated in FIGS. 11 and 12, according to which, on the one hand, the locking element 55 is a pawl mounted rotatably on a flange 60, constituting a first part with the hub 10 to which it is attached, and on the other hand, the hub disc 11, forming a second part associated with the previous, comprises, for co-operation with the locking element 55, a lug 56 which extends axially and which interferes with the path of rotation of the locking element 55 about its axis.

Like the previous flange 23, the flange 60 in this case is a diametrally elongate flange and no longer an annular flange.

In practice, in the exemplary embodiment illustrated, the axis of rotation of the locking element 55, which is designated by the general reference 57, extends parallel to the axis of the assembly.

It is crossed by a pin 58 which, being clipped onto the flange 60 by means of a slit 59 in the latter constitutes the elastic return means associated with the locking element 55.

The latter has in practice a hook-shaped configuration for its engagement in pull-back operation upon the associated lug 56 when, the speed of rotation of the friction means being sufficient, it has consequently pivoted about its axis 57 by the effects of the centrifugal force.

The function of this variant of embodiment is analogous to that described hereinbefore: above a speed of the order of 900 to 1,100 r.p.m., the low rigidity springs 16 are rendered inoperative.

In the variants of embodiment illustrated in FIGS. 13 to 15, the flange 62 to be employed is arranged in the volume inside the guide washers 12, between one of the latter, in practice the one the more remote from the friction disc 13, and the hub disc 11.

As will be seen more clearly in FIG. 14, such a flange 62 is crimped onto the hub 10 in contact with the transverse shoulder 63 formed by the tooth system 64 thereof.

For its engagement with the springs 18, the flange 62 exhibits ports 65, and the latter each have a sufficiently great circumferential length not to interfere with the corresponding spring 18.

In the embodiment illustrated in FIGS. 13 and 14, the flange 62 is an annular flange carrying on its circumference a crown 48 for co-operation with locking elements 40 of the type described with reference to FIGS. 8 to 10, i.e., locking elements arranged at the ends of elastically deformable arms 41 which are carried by the hub disc 11 and which extend circumferentially, although an inverse arrangement could be adopted, as mentioned previously.

Obviously, the present invention is not limited to the embodiments described and illustrated, but embraces all variants of execution and/or of combination of their various elements.

For example, in the case of the embodiment illustrated in FIGS. 8 to 10, the locking element 40, instead of being formed by a fold of the elastically deformable arm 41 which carries it, may be formed by a strip attached to such an arm, e.g., by riveting.

Furthermore, the respective roles of the two rotary coaxial parts between which the locking element according to the invention acts may be interchanged, as already specified hereinbefore.

Furthermore, arrangements of the type of those with friction washer fitted with a toothed means described in the French Patent application filed on Apr. 4, 1977 under No. 77 10034 may be adopted.

In addition, friction means may, at least in certain particular applications, be associated with the locking element according to the invention in order to introduce a "hysteresis" into its action, i.e., a delay, at least for the return to the standby retracted position.

Furthermore, although in the foregoing the locking element employed acts during the change from an on haul mode of operation to a pull-back mode of operation, it could equally well act during a change from a pull-back mode of operation to an on haul mode of operation; in the case e.g., of an embodiment of the type illustrated in FIG. 17, only a positioning of the relevant components symmetrical to that illustrating with reference to the relevant spring 18 is required.

Furthermore, the invention is equally well applicable to torsion damping devices wherein, two concentric hubs being provided with meshing means with clearance between them, the guide washers are integral with the outer hub, whereas the friction disc is integral with the hub disc, and the latter is freely rotatable with reference to the assembly, circumferentially effective elastic means being interposed between it and said guide washers.

Finally, the field of application of the invention is not limited to that of clutch friction means for motor vehicles, but extends to that of any other torsion damping device.

I claim:

1. Torsion damping device, particularly a clutch plate, of the type comprising at least two coaxial parts mounted for rotation relative to each other within limits of predetermined angular displacement counter to a first circumferentially acting elastic means adapted to act circumferentially therebetween for at least one range of said angular displacement, at least one locking element sensitive to centrifugal force counter to return means and reversibly movable because an inoperative standby position for permitting freedom of action of said first circumferentially acting elastic means and an operative position, above a predetermined speed of rotation associated with said return means for producing a positive circumferential abutment of one of said parts against the other of said parts for at least one of the directions of rotation, and thereby rendering said first circumferentially acting elastic means inoperative at least for a portion of said range of angular displacement.

2. Torsion damping device according to claim 1, characterized in that a first of the said parts carries a guide engageable with said locking element, and the second of said parts comprises a lug which extends axially into the path of movement of the locking element along said guide.

3. Torsion damping device according to claim 2, characterised in that the locking element comprises a radially elongate recess which is formed in a flange fixed to said first part and said locking element is fitted being slidable in said guide.

4. Torsion damping device according to claim 3, characterised in that said flange (23) comprises, at the end of the guide recess a retaining nose which projects into said guide recess and, beyond a shoulder adapted to abut radially against the said retaining nose, said locking element comprising a radial extension against which said axial lug of said second part is adapted to bear.

5. Torsion damping device according to any of claims 2 to 4, characterised in that two said locking elements are provided in diametrally opposite positions and said return means being common to said two locking elements, said return means comprising a torsion spring having two branches respectively attached to the two locking elements.

6. Torsion damping device according to claims 3 or 4, wherein said first of said parts comprises a hub.

7. Torsion damping device according to claim 6, wherein said second part comprising an annular hub disc mounted rotatably on said hub, characterised in that the axial lug provided on said second part for co-operation with the locking element is integrally formed with said hub disc.

8. Torsion damping device according to claim 1, characterised in that the locking element is carried by an arm which extends circumferentially and which, remote from the locking element, is fixed to a first of said parts, said arm comprising the return means for the said locking element.

9. Torsion damping device according to claim 8, characterised in that the arm comprises a web of radially relatively thin and axially relatively wide cross-section.

10. Torsion damping device according to claim 8 or 9, characterised in that, for co-operation with the locking element, an annular member is associated with the second of said parts, said annular member being arranged transversely in line with the locking element beyond the latter and fixed for rotation with the said second part for at least a portion of the predetermined angular displacement between said first and second parts.

11. Torsion damping device according to claim 10, characterised in that the annular member is carried by a flange fixed to said second part.

12. Torsion damping device according to claim 10, characterised in that, for co-operation with the locking element (40), the annular member associated with the second part bias at least one groove.

13. Torsion damping device according to claim 12, characterised in that the edge of said groove cooperable with the locking element is bevelled.

14. Torsion damping device according to claim 13, characterised in that the corresponding edge of the locking element is itself bevelled in complementary manner.

15. Torsion damping device according to claim 10, characterised in that a friction lining is interposed between the locking element and the associated annular member.

16. Torsion damping device according to claim 1, characterised in that the locking element is mounted rotatably relative to a first of said parts about an axis parallel to the axis of the device, and the second of said parts comprises a lug which extends radially and into the path of rotation of the locking element.

17. Torsion damping device according to claim 16, characterised in that the locking element is mounted rotatably on a flange fixed to said first part.

18. Torsion damping device according to claim 8, wherein said arm carrying said locking element is elastically deformable.

19. Torsion damping device according to claim 18, wherein in the rest position the elastically deformable arm carrying the locking element is elastically preloaded.

20. Torsion damping device according to claim 18, wherein said locking member comprises a folded over end portion of said elastically deformable arm.

21. Torsion damping device according to claim 8 or claim 9, wherein said arm has a slotted portion and is mounted by a radial lug extending through said slotted portion, a circumferentially extending cantilevered retaining portion of said lug, the circumferential dimension of said retaining portion being substantially equal to that of said lug itself.

* * * * *